March 16, 1943.    M. D. RIGTERINK    2,313,842
STEATITE TYPE CERAMIC MATERIAL
Filed April 3, 1941
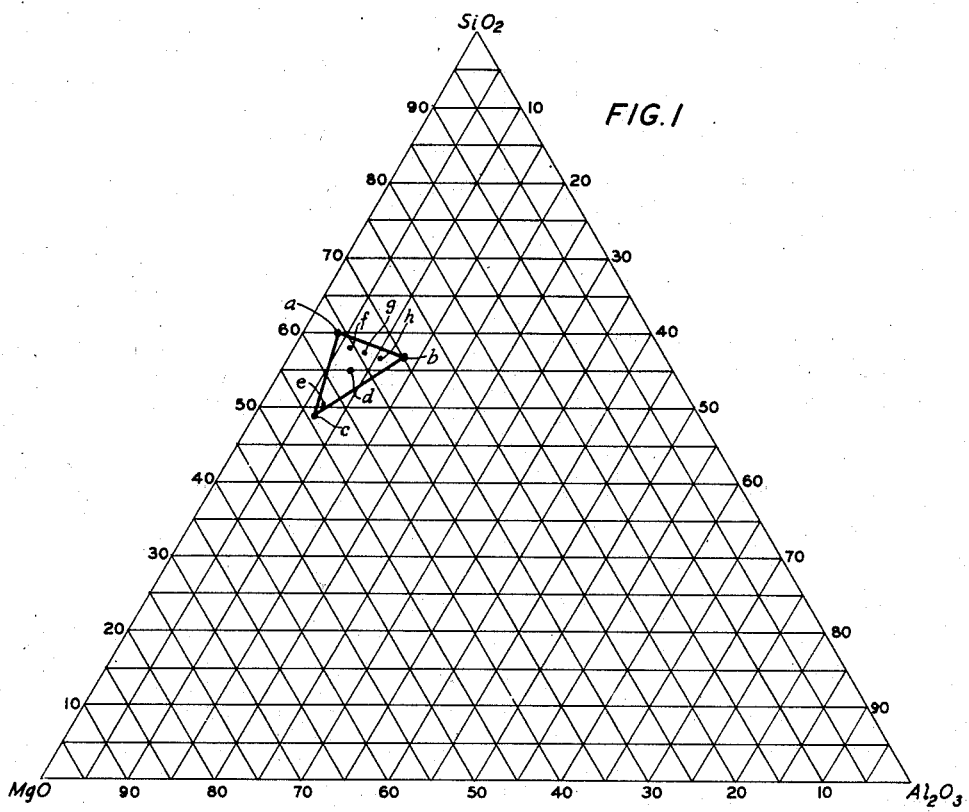
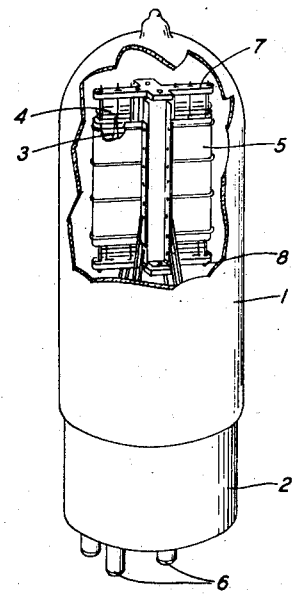
INVENTOR
M. D. RIGTERINK
BY
B. H. Jackson
ATTORNEY Patented Mar. 16, 1943

2,313,842

UNITED STATES PATENT OFFICE 2,313,842

STEATITE TYPE CERAMIC MATERIAL

Merle D. Rigterink, Forest Hills, N. Y., assignor to Bell Telephone Laboratories, Incorporated, New York, N. Y., a corporation of New York Application April 3, 1941, Serial No. 386,606

16 Claims. (Cl. 106—62)

This invention relates to ceramic material and more particularly to fired ceramic material of the steatite type possessing highly advantageous properties.

The ceramic material of the present invention is of the steatite type because the principal raw material employed in preparing it is a suitable naturally occurring magnesium silicate which closely approximates the theoretical formula $3MgO\cdot4SiO_2\cdot H_2O$ and which for the purposes of the present invention may be termed talc. The steatite ceramic material of the invention is contrasted to the porcelain types in which clay, silica and feldspars are the principal ingredients. The raw materials of which the ceramic material of the present invention is formed are talc, clay and a substance which upon firing produces magnesium oxide.

While the ceramic material of the present invention has properties rendering it advantageous for employment for various purposes, it may be employed to good advantage for electrical insulation purposes since it may be produced to have excellent direct and alternating current insulation properties, such as high direct current resistance and low dielectric loss at high frequencies. Therefore it may be employed to advantage in insulators in radio apparatus. Indeed, because it may be produced to have such properties at both low and high temperatures, the ceramic material of the present invention may be particularly advantageously employed in electrical insulators for use as supports for the elements inside of vacuum tubes.

Such use imposes very rigorous requirements on an insulating material. The material must have high resistance to direct currents even at substantial voltages. It must have a low dielectric loss when subjected to high frequency alternating currents, since alternating currents of a megacycle or higher are often employed with vacuum tubes. For low dielectric losses at high frequencies the material must have a low dielectric constant and a low loss angle, since the power loss in a dielectric material subjected to an alternating current of a given frequency and voltage is in proportion to the product of its loss angle and its dielectric constant. Reduction in dielectric loss may be obtained more readily by reducing the loss angle of the material than by attempting to reduce the dielectric constant, which in any event cannot be reduced below the square of the refractive index of the material.

The material must not only have such properties at low temperatures but should retain such properties even at elevated temperatures, for insulators in vacuum tubes are often subjected during operation of the tubes to temperatures of from 300° C. to 700° C., and may even be subjected for short periods during manufacture to temperatures of as high as 1000° C.

Material for use in insulators employed in vacuum tubes, moreover, should be capable of being molded into intricate shapes, and should be capable of being manufactured to size within close limits. Preferably the material should be very dense and of low porosity or, on the other hand, quite porous, to minimize the possibility of entrapment therein of occluded gases or other foreign substances which might deleteriously affect the electrical characteristics of the material or the operation of the tube.

Fused quartz has heretofore been considered the ideal dielectric of the inorganic type, since it has a low dielectric constant and low dielectric losses at high frequencies. However, it is very difficult to fabricate into the complicated shapes necessary for vacuum tube and other insulators, and at high temperatures in the neighborhood of 400° C. or above its dielectric losses increase substantially.

Because of these disadvantages of quartz it has been proposed to employ steatite type ceramics for insulating purposes since they may be more readily formed into intricate shapes than quartz and since their electrical properties do not change deleteriously with a rise in temperature to an extent as great as those of quartz. However, in general the dielectric losses of such materials heretofore employed have been greater than desirable and, as far as is known, higher than those of quartz, especially at high temperatures.

The ceramic material of the present invention may be readily formed into intricate shapes, either by molding or by machining operations, the latter being preferably performed before the material is finally fired. The material may be made so that it is heat resistant and possesses at both low and high temperatures dielectric properties, including high direct and alternating current resistances over a wide range of currents and voltages, approaching or even surpassing those of quartz. It may readily be made as dense or as porous as is desired.

The composition and characteristics of ceramic material embodying the invention will be discussed in connection with the accompanying drawing, in which:

Fig. 1 is a triaxial diagram indicating the composition of the material of the present invention; and Fig. 2 represents a vacuum tube, parts being broken away to show the insulators which may be formed of ceramic material embodying the invention.

The ceramic material of the present invention essentially consists of from about 64 to about 86 per cent of weight of talc, from about 8 to about 30 per cent by weight of clay, such as a kaolin, and a substance which, upon firing, produces from about 6 to about 20 per cent by weight of magnesium oxide, these constituents being fired together. Such a magnesium oxide producing substance may be magnesium oxide itself, magnesium carbonate, magnesium sulphate, or the like.

The fired ceramic material has a composition which, when calculated as oxides, falls within the area bounded by the triangle indicated on the triaxial diagram of Fig. 1, which is an

$MgO—Al_2O_3—SiO_2$ percentage by weight triaxial diagram. As apparent from the triaxial diagram of Fig. 1, the triangular area indicated above is approximately defined by the points $a$, $b$, and $c$, the coordinates of which in percentages by weight are: for point $a$, MgO—36 $Al_2O_3$—4, $SiO_2$—60; for point $b$, MgO—30, $Al_2O_3$—13, $SiO_2$—57; and for point $c$, MgO—44, $Al_2O_3$—7, $SiO_2$—49. The proportions by weight of raw materials required to produce the compositions indicated by these points are approximately as follows: for point $a$, 85.8 per cent of talc, 7.5 per cent of clay and 6.7 per cent of magnesium oxide or its equivalent; for point $b$, 63.5 per cent of talc, 29.8 per cent of clay, and 6.7 per cent of magnesium oxide or its equivalent; and for point $c$, 63.3 per cent of talc, 15.9 per cent of clay and 20.8 per cent of magnesium oxide or its equivalent.

The raw materials of which the ceramic material here described is formed usually contain as impurities small amounts of compounds of other metals, such as ferric oxide, ferrous oxide, sodium oxide, potassium oxide, titanium dioxide, etc. Usually such impurities are present in the final ceramic material in amounts of less than about 1 per cent by weight, and are for the purposes of convenience considered to be contained in the constituents shown on the triaxial diagram.

Ceramic material embodying the present invention is predominantly crystalline in character although containing substantial proportions of glass, in general from about 15 per cent to about 50 per cent by volume. The glass, which is a complex glass, has good dielectric properties and provides strength for the ceramic material by cementing together the crystalline portions thereof. The crystalline phase is primarily magnesium meta-silicate, $MgO—SiO_2$, preferably of the meso-enstatite type described by Thilo in Ber. deut. chem. Ges., volume 70, page 2373 and volume 72, page 341. In such case the small meso-enstatite crystals constituting the major portion of the ceramic material play a large part in providing good electrical insulation properties.

The ceramic material advantageously and readily may be made of a dense, substantially non-porous structure which is advantageous for most uses. When the ceramic material is employed in vacuum tubes, for instance, such structure minimizes the possibility of the presence in the material of absorbed or occluded gases or other substances which might impair the operation of the tube as indicated above, and in other cases reduces the possibility of moisture absorption by the material with consequent electrical losses. However, it is possible to provide a porous structure, if desired, as by incorporating in the raw materials during mixture a substantial amount of an organic substance which on firing is burned out to leave a porous ceramic structure.

A rough surface which is advantageous for certain uses, as when coatings are to be applied on the ceramic material, may be readily produced on the material, even though it is non-porous. This may readily be accomplished by employing calcined raw materials, such as calcined magnesium oxide. During the firing of the ceramic material, the hard particles of the calcined material apparently retain their identity to an appreciable extent and thus provide the desired rough surface.

The formation of ceramic materials of the invention from talc, clay, and magnesium oxide or its equivalent in the proportions indicated above is advantageous since suitable mixing and firing of such raw materials in such proportions provide ceramic materials containing glassy and crystalline phases of such natures and such relative proportions as provide exceptionally good direct current resistances at both high and low temperatures and exceptionally low dielectric losses at both high and low temperatures when the material is employed as an insulator for alternating currents, together with very good mechanical properties, such as strength and heat resistance. Ceramic materials of approximately the same oxide compositions but formed of different raw materials, or formed of the same raw materials in different proportions do not possess these desirable properties.

For the purpose of controlilng and readily obtaining the desired mechanical and electrical insulating properties of this ceramic material, it is advantageous to employ raw materials of at least reasonably high purity. Particular care should be taken to insure as high a degree of freedom as possible from alkali metal compounds since they harmfully affect the electrical properties of the material.

This may be achieved by selection of raw materials of high purity having a low or preferably no alkali content, or by purification of raw materials to remove the alkali or other impurities completely or to as great an extent as possible. It has been found that the presence of as little as 0.1 per cent of the oxide of one or more alkali metals will cause a noticeable change in the electrical properties of the material; an alkali content of more than about 0.5 per cent calculated as the oxide in the ceramic should be avoided since it will harmfully affect the electrical properties of the material. It appears that the alkali metals cause the formation in the ceramic material of glasses having unfavorable dielectric properties, particularly at elevated temperatures. Iron oxides, while undesirable, are not as harmful as alkali oxides.

It is further desirable that during the handling, mixing and firing of the mixed raw materials precautions be taken that no undesirable impurities are introduced. Thus, it is advantageous to employ pure water for mixing purposes to insure that no impurities are present in the water which might detrimentally affect the properties of the ceramic material.

The mixing of the raw materials should be performed under conditions such that an intimate and very homogeneous mixture of the materials is provided. Otherwise the resulting ceramic material may be of non-uniform composition and hence have portions therein of inferior insulation or dielectric properties. In preparing the ceramic material from raw materials such as talc, a clay such as a kaolin, and magnesium carbonate, it is advantageous to place the proper proportions of these materials in finely divided form in a rubber lined ball mill drum with enough distilled water therein to form a thick slip. Good results are obtained when the raw materials and the balls in the drum, which may advantageously be sillimanite balls, fill approximately two-thirds of the drum, the volumes of the balls and the dry raw materials being preferably approximately equal. The drum should then be rotated for a period long enough to mix thoroughly and homogeneously the raw materials in the form of a thick slip. Thus, rotation of a drum about 8 inches in diameter at about 60 revolutions per minute for a period of about twenty hours has been found advantageous. Such relatively long mixing period results in grinding of the raw materials to an extremely finely divided form, which is advantageous in that it promotes homogeneity and reactivity of the ingredients in firing. An alternative mixing procedure may be employed involving first mixing the raw materials with distilled water in a baker's type double motion paddle mixer and then circulating the mixture through a colloid mill for a suitable period of time. Ceramic materials molded and fired from mixtures formed in this manner, although satisfactory, usually do not have electrical properties quite as good as those resulting from ball mill mixing.

Dry mixing of the raw materials may also be performed satisfactorily.

While shaped bodies of the ceramic materials of the present invention can be formed in the desired shapes by casting or extrusion, they may advantageously be formed by molding of dry or only slightly moist mixed raw materials according to the dry press process, after which the bodies may be fired. Such molding process is particularly advantageous for producing accurately shaped pieces.

The ceramic material of the present invention generally shrinks appreciably during the firing operation, usually about 10 to 20 per cent in a direction normal to the direction of applied pressure in the mold and from about 3 to 5 per cent more in a direction parallel to that of the applied pressure in the mold, depending largely upon the pressure employed. Therefore, when the material is cast, molded or extruded in shape, allowance should be made in the design of the dies for shrinkage of the material, so that the desired final size and shape of the article formed of the material is obtained. By proper choice of pure, identical raw materials and by following identical manufacturing procedures, a high degree of reproducibility is obtained. That is, ceramic materials having practically identical characteristics, sizes and shapes may be readily produced in large numbers.

When it is desired to press-mold the material which has been mixed by a method involving the preparation of a wet slip, the manner of dewatering the slip also affects to a certain extent the electrical properties of the resulting ceramic material. Thus, when the slip, after removal from the mixing mill, is partially dried to a thick paste while being mixed in a double motion paddle mixer and then completely dried by being heated on porous plates with intermediate screening, very satisfactory electrical properties are obtained in the fired ceramic material. Dewatering of the slip by filtering is also satisfactory, providing the filtering operation is performed in a short enough time so that stratification and hence heterogeneity of the mixture does not result.

In some circumstances it may be advantageous to incorporate temporary binders in the mixture of raw materials. Thus if the mixture is being cast, it is advantageous to include such a binder in order to impart sufficient strength to the article to hold it together while it is being handled and fired. Again, it is advantageous to incorporate a temporary binder in the mixture to permit the article to be machined after it has been press-molded and prior to its firing. Examples of temporary binders which may be employed for such purposes are the dextrins, of which yellow potato dextrin is exceptionally good. Binders formed of the residues extracted from wood in the sulphite process and paraffin binders may also be advantageously employed. Up to 3 per cent of such a binder may be employed without appreciably increasing the porosity of the ceramic material. Larger proportions of such binders may be employed if it is desired to provide a porous ceramic material, since such organic binders burn out upon firing of the material. The presence of such binders appears to reduce the pressure necessary in the press-molding operation, since the binder apparently aids the flow of the mixture of the raw materials in the mold.

Other substances besides binders may be mixed with the raw materials to produce a porous material. Thus, wood flour, in amounts as great as 25 per cent or more by volume of the other raw materials, may be employed. Such substance also burns out the ceramic material on firing, leaving a porous structure.

In the firing of ceramic material of the kind to which the present invention is directed, the heat treatment employed determines to a considerable extent the physical and other properties of the finished material. It has a pronounced effect on the micro-structure and electrical properties. The heat treatment is, of course, governed to a large extent by the size and shape of the cross section of the articles being fired. Furthermore, it is apparent that from the cost viewpoint, the most economical firing operation is the shortest one which will make possible the desired properties of the material.

During the firing operation, which is such that vitrification occurs, numerous fusions, reactions, inversions and crystallizations occur, and the firing temperature, heating and cooling times should be such as to permit such actions to take place to the extent necessary to provide the desired properties of the ceramic material. The maximum or maturing firing temperature should not be so high that the article formed of the materials becomes overfired, as is evidenced by the formation of blebs and considerable distortion or warping of the ceramic material, although some shrinking necessarily occurs. The maximum firing temperature should not be too low, or else the desired reactions and changes will not occur or will not occur to the desired extent.

It is advantageous to employ a maturing temperature of about 5° C. below the temperature at which blebs begin to form to provide a dense, non-porous material of good alternating and direct current insulating properties. A lower temperature, to as low as 50° C. or 60° C. below the melting temperature may be employed without substantially decreasing the desirable insulating properties, but with an increase in the porosity of the ceramic material. In general, maturing temperatures lying between about 1200° C. and about 1300° C. are employed in firing the ceramic materials of the invention.

In firing to vitrification ceramic material embodying the present invention it is advantageous to control the maximum firing temperature within close limits, preferably within plus or minus 5° C. to obtain uniform reproductibility.

Very rapid heating and cooling, which allow insufficient time for the numerous reactions, fusions, inversions, and crystallizations to reach equilibrium, have detrimental effects upon the properties of the finished material. Slower heating, holding at the maximum temperature for a substantial period, and slow cooling provide better electrical properties. Slow cooling, apparently because it promotes crystallization, particularly aids in the production of a material of good dielectric properties. Holding at the maximum temperature for a long period promotes the formation of glass and decreases the porosity of the ceramic materials.

A comparatively short firing schedule may be employed in firing the ceramic materials of the present invention with good results as far as the physical and electrical properties are concerned. Thus, for ceramic materials of cross sections on the order of those found in vacuum tube insulators, i. e., approximately one-four inch or less in thickness, a firing schedule has been found advantageous in which approximately six hours is taken to reach the maturing temperature, then a soak at said temperature for an hour or an hour and a half, followed by a slow cooling for from six to eighteen hours, as is provided, for example, when the ceramic material is left in the furnace after heating thereof has been discontinued.

Bodies, such as insulators, of ceramic material of the present invention may be machined to shape, if desired, instead of being molded. The machining advantageously is performed before final firing and vitrification of the ceramic material since the unfired material is more readily machinable than the fired material. As indicated above, a small amount of a suitable binder may be incorporated in the mixed raw materials which may be formed into a body which upon drying has sufficient strength to be handled and machined. Alternatively, the mixed raw materials, with or without a binder, may be pre-fired to a temperature substantially below the maturing temperature after which, on cooling, they are coherent enough to be machined.

For the purposes of illustration the composition, method of manufacture and electrical properties of each of several ceramic materials of the present invention will be indicated in the following examples. In each of these examples the ceramic material was formed into a disc about 2½ inches in diameter and from .075 inch to .1 inch in thickness. For the electrical measurements of direct current resistance and dielectric properties under alternating current conditions, silver electrodes were applied to the opposite surfaces of each disc by means of a silver paste. To accomplish this, a paste containing a suspension of silver in an organic binder was applied to the opposite faces of the disc, which was then heated to burn out the organic binder and leave on each side of the disc a residue of metallic silver with which electrical contact could be made.

The values for direct current resistances were measured at 100 volts by the direct deflection galvanometer method described at page 194 of Law's "Electrical Measurements," McGraw-Hill Book Company, Inc., New York, 1938. The dielectric properties of the material when subjected to alternating current were determined according to methods and apparatus of the type described by Thurnauer and Badger in the Journal of the American Ceramic Society, pages 9–12, January 1940. The magnitude of the dielectric loss is indicated by the values of Q determined by this method; that is, the higher the value of Q the less the energy lost in the form of heat in the dielectric. The term "Q" designates the ratio of reactance to resistance or susceptance to conductance of the ceramic article. In the case of articles of the type tested, which may be presented by a loss free capacitance shunted by a conductance G, $$Q = \frac{\omega C}{G} = \frac{1}{\tan \delta}$$

where

G = equivalent parallel conductance of test piece
C = equivalent parallel capacitance
$\omega = 2\pi \times$ frequency
tan $\delta$ = tangent of the loss angle of the ceramic material.

The resistance and dielectric loss measurements at elevated temperatures were made while the test piece was heated to the desired temperature in a small furnace. The measurements are believed to be relatively accurate to within 10 per cent plus or minus.

The dielectric constants of the ceramic materials described below, although not individually noted below, were between about 5 and about 7.

*Example 1*

On a weight basis, 80 parts of talc, 20 parts of kaolin, and 30 parts of chemically pure magnesium carbonate were mixed to form the material from which the ceramic material was fired. Considering the magnesium carbonate as being converted to the oxide, this corresponded to a raw material composition of approximately 70 per cent of talc, 17.5 per cent of kaolin, and 12.5 per cent of magnesium oxide.

The theoretical analysis for talc, $$3MgO - 4SiO_2 - H_2O$$

and the typical analysis of the California talc employed are, in percentages by weight:

|  | Theoretical | Actual |
|---|---|---|
| $SiO_2$ | 63.5 | 61.1 |
| $MgO$ | 31.7 | 31.3 |
| $Al_2O_3 + Fe_2O_3$ |  | 1.7 |
| $CaO$ |  | Trace |
| Alkalis |  |  |
| Loss on ignition | 4.8 | 4.5 |

The theoretical analysis $Al_2O_3 - 2SiO_2 - 2H_2O$, for kaolin, a fairly pure clay, and the typical analysis of the Florida kaolin employed are, in percentages by weight:

|  | Theoretical | Actual |
|---|---|---|
| $SiO_2$ | 46.5 | 47.0 |
| $Al_2O_3$ | 39.5 | 36.8 |
| $Fe_2O_3$ |  | 0.8 |
| $CaO$ |  | 0.15 |
| $MgO$ |  | 0.2 |
| $TiO_2$ |  | 0.18 |
| Alkalis |  | 0.24 |
| Loss on ignition | 14.0 | 15.0 |

The raw materials in the above-indicated proportions, preferably in finely divided form, were placed in a rubber lined 8 inch diameter ball mill drum containing an equal volume of sillimanite balls, the raw materials and balls filling the drum approximately two-thirds full. Enough distilled water was added to form a slip. The drum was rotated for about 20 hours at about 60 revolutions per minute, after which the slip was removed and placed in a double motion paddle mixer, in which the slip was mixed while heat was applied thereto until it dried into a thick paste. The paste was then dried further by being heated on porous plates, until it could be forced through a 10-mesh screen with little deformation of the material. After passing through this screen, it was alternately dried and forced through 20 and 40-mesh screens.

The 40-mesh or finer powder was then processed so as to bring it to approximately 5 per cent moisture content. Discs approximately 2½ inches in diameter and from .075 to .1 inch in thickness were pressed from the powder in a steel mold at a pressure of about 8 tons per square inch. Pressure was advantageously momentarily released at pressures of about 0.4, 2 and 4 tons per square inch, such breathing of the samples being helpful in preventing the formation of laminations.

The discs were then fired in a gas fired ceramic kiln according to a firing schedule in which approximately 6 hours were taken to reach the maturing temperature which was advantageously about 1290° C. The discs were held at the maturing temperature for an hour to an hour and a half, after which they were allowed to cool slowly to room temperature for from 6 to 12 hours or more.

The constituents of the finished ceramic material calculated as oxides corresponded to a percentage by weight of approximately 55 per cent $SiO_2$, 37 per cent MgO and 8 per cent $Al_2O_3$. This composition is represented approximately by the point $d$ on the triaxial diagram of Fig. 1.

The discs were hard, dense and strong. They were predominantly crystalline in character, although they contained substantial amounts of glass which served to cement the crystalline phases in the materials. The crystals were very small and X-ray examination of their lattice structure revealed that they were substantially all of the meso-enstatite type. Testing of ceramic discs at elevated temperatures for direct current resistance and dielectric loss characteristics indicated that at about 350° C. this material had a specific resistance of approximately $2.2 \times 10^{10}$ ohm centimeters and values of Q at 100 kilocycles of about 38 and at 3 megacycles of about 115.

Example 2

In this example the same constituents as in Example 1 were employed in the following proportions: 80 parts of talc, 20 parts of kaolin and 50 parts of magnesium carbonate. On a magnesium oxide basis this corresponded to a raw material composition of about 64.5 per cent of talc, 16.0 per cent of kaolin and 19.5 per cent of magnesium oxide.

These raw materials were mixed, molded and fired according to the procedure outlined in Example 1, the firing temperature being about 1290° C. The completed ceramic material had approximately the following percentage by weight composition, the metals being calculated as oxides: 50.4 per cent of $SiO_2$, 42.2 per cent of MgO, and 7.4 per cent of $Al_2O_3$. This composition is approximately designated by the point $e$ on the triaxial diagram of Fig. 1.

The physical characteristics of the ceramic material of this example were practically identical with those of the ceramic material of Example 1. The direct current resistance and alternating current dielectric loss characteristics at about 350° C. determined by the methods indicated above indicated that this ceramic material had a specific resistance of about $5 \times 10^{10}$ ohm centimeters and a value of Q at 100 kilocycles of about 42 and at 3 megacycles of about 108.

Example 3

In this example, the same constituents as Example 1 were employed in the following proportions by weight: 86 parts of talc, 14 parts of kaolin, and 20 parts of magnesium carbonate. On a magnesium oxide basis this corresponded to a raw material composition of approximately 78.5 per cent of talc, 21.8 per cent of kaolin, and 8.7 per cent of magnesium oxide.

A ceramic material embodying the present invention was formed by mixing and firing the materials to a temperature of approximately 1290° C. according to the procedure indicated in Example 1. The finished ceramic material had approximately the following percentage by weight composition, the metals being calculated as oxides: 58.0 per cent of $SiO_2$, 35.7 per cent of MgO, and 6.3 per cent of $Al_2O_3$. This composition is represented approximately by the point $f$ of the triaxial diagram of Fig. 1.

Discs of this material made and tested according to the procedure indicated above for direct and alternating current insulation characteristics revealed that this material at a temperature of about 350° C. had a specific resistance of about $7 \times 10^9$ ohm centimeters and a value of Q at 100 kilocycles of about 28 and at 3 megacycles of about 125. The physical characteristics of this material were substantially identical with those of Example 1.

Example 4

In this example the following proportions by weight of the raw materials of Example 1 were employed: 80 parts of talc, 20 parts of kaolin, and 20 parts of magnesium carbonate. Considering the magnesium carbonate to be converted to the oxide, the raw material composition was approximately 73 per cent of talc, 18.3 per cent of kaolin, and 8.7 per cent of magnesium oxide.

These raw materials were mixed and fired to a temperature of approximately 1290° C. according to the procedure outlined in Example 1. The finished ceramic material had a percentage by weight composition of the metal constituents calculated as oxides of approximately 57.5 per cent of $SiO_2$, 34.1 per cent of MgO and 8.4 per cent of $Al_2O_3$. The composition of this ceramic material is approximately indicated by the point $g$ on the triaxial diagram. The physical characteristics of the ceramic material of this example were approximately identical with those of the ceramic material of Example 1. The direct current resistance and alternating current dielectric loss characteristic, determined according to the methods indicated above, indicated that at approximately 350° C. this ceramic material had a specific resistance of about $6 \times 10^9$ ohm centimeters and a value of Q for 100 kilocycles of approximately 36 and for 3 megacycles of approximately 125.

Example 5

To prepare the ceramic materials of this example, 74 parts by weight of the talc of Example 1, 26 parts by weight of the kaolin of said example, and 20 parts by weight of chemically pure magnesium carbonate had employed. On the magnesium oxide basis, the raw material composition was approximately 67.5 per cent of talc, 23.7 per cent of kaolin, and 8.8 per cent of magnesium oxide. The ceramic material was prepared by mixing and firing the raw materials in accordance with the procedure outlined in Example 1 to a firing temperature of approximately 1290° C.

The composition of the finished ceramic material on the oxide basis was on the weight basis approximately 56.6 per cent of $SiO_2$, 32.8 per cent of MgO, and 10.6 per cent of $Al_2O_3$. This composition is approximately indicated by the point $h$ on the triaxial diagram of Fig. 1. The finished ceramic material was predominantly crystalline in nature but contained a large proportion of glassy material. The crystals, as in the ceramic material of Example 1, were predominantly meso-enstatite. Direct current characteristics of the material at elevated temperatures, measured according to the procedure indicated above, were indicated by the fact that the material had a specific resistance at 350° C. of approximately $7 \times 10^9$ ohm centimeters. The alternating current insulation characteristics of the material at elevated temperatures were indicated by the fact that when measured as indicated above at 350° C. the material had a value of Q of approximately 25 for 100 kilocycles and approximately 78 for 3 megacycles, these values being determined as indicated above.

Since the direct current and alternating current insulation characteristics of the ceramic materials of the above examples were even better at room or ordinary temperatures, it has not been considered necessary to indicate them.

As indicated above, ceramic materials embodying the invention may be advantageously employed as insulators for supporting the elements of vacuum tubes because of the high resistance and low dielectric loss characteristics at elevated temperatures and with high frequency currents which may be obtained with such materials. Fig. 2 illustrates a typical vacuum tube, comprising an evacuated or gas-filled glass envelope 1 supported by socket 2. Elements such as filament 3, grid 4 and plate 5 contained within the glass envelope 1 are connected to the corresponding contacting members 6 carried by the socket 2, and are supported and positioned by insulators 7 and 8. Such insulators are subjected to high frequency currents and heavy direct currents passing to and between the elements, and to high temperatures, particularly in high power tubes. Such insulators may be very advantageously formed of the ceramic materials of the present invention.

Although ceramic materials of the present invention have been primarily discussed as being useful for vacuum tube insulators, it is obvious that materials embodying the invention may be employed for other purposes. Thus, they have even better direct current resistance properties and lower alternating current dielectric losses at low temperatures than at elevated temperatures, and they may be employed to good advantage in radio apparatus or other low temperature electrical insulation apparatus. Their heat resistance properties render them useful for various other high temperature purposes. The ceramic materials embodying the invention may also be advantageously employed if desired for non-electrical purposes.

The present invention thus provides ceramic materials made of talc, clay and magnesium oxide or a substance which on firing produces magnesium oxide which, when employed in the proportions indicated, provide exceptionally good dielectric properties both at elevated and room temperatures and with direct and alternating currents. The present invention also is intended to include ceramic materials, the raw materials of which contain other substances which do not appreciably modify the electrical properties resulting from the composition employed according to the invention of talc, clay and magnesium as its ingredients.

Various modifications may be made in the methods discussed above of preparing the ceramic materials of the present invention, and various other methods of preparing such materials may be employed without departing from the spirit of the invention. Similarly suitable other raw materials than those specifically indicated may be employed for producing the ceramic materials of the invention.

In the appended claims the magnesium oxide described in the raw materials is intended to include, besides magnesium oxide per se, such equivalent materials which upon firing will produce magnesium oxide, as magnesium carbonate, magnesium sulphate, magnesium nitrate, or the like.

It is intended that the patent shall cover by suitable expression in the appended claims whatever features of novelty reside in the invention.

What is claimed is:

1. A predominantly crystalline ceramic material consisting essentially of talc, clay and magnesium oxide fired together in such proportions that they form a composition the constituents of which calculated as oxides fall within a triangular area on a $MgO$-$Al_2O_3$-$SiO_2$ triaxial diagram approximately defined by the points MgO—36, $Al_2O_3$—4, $SiO_2$—60; MgO—44, $Al_2O_3$—7, $SiO_2$—49; and MgO—30, $Al_2O_3$—13, $SiO_2$—57, which ceramic material contains no more than a small amount of alkali oxides.

2. A ceramic material of the character described in claim 1 which contains between about 15 per cent and about 50 per cent of glass by volume.

3. A ceramic material of the character described in claim 1 in which the crystalline phase is substantially all meso-enstatite.

4. A predominantly crystalline ceramic material consisting essentially, by weight, of from about 64 per cent to about 86 per cent of talc, from about 8 per cent to about 30 per cent by weight of clay and from about 6 per cent to about 20 per cent of magnesium oxide, said materials being fired together to form a composition the constituents of which calculated as oxides fall within a triangular area on a $MgO$-$Al_2O_3$-$SiO_2$ triaxial diagram approximately defined by the points MgO—36, $Al_2O_3$—4, $SiO_2$—60; MgO—44, $Al_2O_3$—7, $SiO_2$—49; and MgO—30, $Al_2O_3$—13, $SiO_2$—57, which ceramic material contains no more than a small amount of alkali oxides.

5. A ceramic material of the character described in claim 4 which contains between about 15 per cent and about 50 per cent of glass by volume.

6. A predominantly crystalline ceramic material consisting essentially, by weight, of about 70 per cent of talc, about 17.5 per cent of clay and about 12.5 per cent of magnesium oxide fired together, said ceramic material containing no more than a small amount of alkali oxides.

7. A predominantly crystalline ceramic material consisting essentially, by weight, of about 64.5 per cent of talc, about 16.0 per cent of clay, and about 19.5 per cent of magnesium oxide fired together, said ceramic material containing no more than a small amount of alkali oxides.

8. A predominantly crystalline ceramic material consisting essentially, by weight, of about 73 per cent of talc, about 18.5 per cent of clay and about 8.5 per cent of magnesium oxide fired together, said ceramic material containing no more than a small amount of alkali oxides.

9. An electrical insulator made up of a predominantly crystalline ceramic material consisting essentially of talc, clay and magnesium oxide fired together in such proportions that they form a composition the constituents of which calculated as oxides fall within a triangular area on a $MgO$-$Al_2O_3$-$SiO_2$ triaxial diagram approximately defined by the points MgO—36, $Al_2O_3$—4, $SiO_2$—60; MgO—44, $Al_2O_3$—7, $SiO_2$—49; and MgO—30, $Al_2O_3$—13, $SiO_2$—57, which ceramic material contains no more than a small amount of alkali oxides.

10. An electrical insulator of the character described in claim 9 in which the crystalline phase of the ceramic material is substantially all meso-enstatite.

11. An electrical insulator made up of a predominantly crystalline ceramic material consisting essentially, by weight, of from about 64 per cent to about 86 per cent of talc, from about 8 per cent to about 30 per cent of clay and from about 6 per cent to about 20 per cent of magnesium oxide, said materials being fired together to form a composition the constituents of which calculated as oxides fall within a triangular area on a $MgO$-$Al_2O_3$-$SiO_1$ triaxial diagram approximately defined by the points MgO—36, $Al_2O_3$—4, $SiO_2$—60; MgO—44, $Al_2O_3$—7, $SiO_2$—49; and MgO—30, $Al_2O_3$—13, $SiO_2$—57, which ceramic material contains no more than a small amount of alkali oxides.

12. An electrical insulator made up of a predominantly crystalline ceramic material consisting essentially, by weight, of from about 64 per cent to about 86 per cent of talc, from about 8 per cent to about 30 per cent by weight of clay and from about 6 per cent to about 20 per cent of magnesium oxide, said materials being fired together to form a composition the constituents of which calculated as oxides fall within a triangular area on a $MgO$-$Al_2O_3$-$SiO_2$ triaxial diagram approximately defined by the points MgO—36, $Al_2O_3$—4, $SiO_2$—60; MgO—44, $Al_2O_3$—7, $SiO_2$—49; and MgO—30, $Al_2O_3$—13, $SiO_2$—57, said ceramic material containing from about 15 to about 50 per cent of glass by volume and no more than a small amount of alkali oxides.

13. An electrical insulator made up of a predominantly crystalline ceramic material consisting essentially, by weight, of about 70 per cent of talc, about 17.5 per cent of clay, and about 12.5 per cent of magnesium oxide fired together, said ceramic material containing no more than a small amount of alkali oxides.

14. An electrical insulator made up of a predominantly crystalline ceramic material consisting essentially, by weight, of about 64.5 per cent of talc, about 16.0 per cent of clay, and about 19.5 per cent of magnesium oxide fired together, said ceramic material containing no more than a small amount of alkali oxides.

15. An electrical insulator made up of a predominantly crystalline ceramic material consisting essentially, by weight, of about 73 per cent of talc, about 18.5 per cent of clay, and about 8.5 per cent of magnesium oxide fired together, said ceramic material containing no more than a small amount of alkali oxides.

16. A method of producing a ceramic material comprising firing together talc, clay and magnesium oxide in proportions such that they form a ceramic composition the constituents of which calculated as oxides fall within a triangular area on a $MgO$-$Al_2O_3$-$SiO_2$ triaxial diagram approximately defined by the points MgO—36, $Al_2O_3$—4, $SiO_2$—60; MgO—44, $Al_2O_3$—7, $SiO_2$—49; and MgO—30, $Al_2O_3$—13, $SiO_2$—57, which raw materials contain no more than a small amount of alkali oxides, the firing being such that a predominantly crystalline ceramic material containing between about 15 per cent and about 50 per cent of glass by volume is formed.

MERLE D. RIGTERINK.